No. 878,530.　　　　　　　　　　　　　　　　PATENTED FEB. 11, 1908.
A. J. INGLIS.
PNEUMATIC STACKER.
APPLICATION FILED MAY 13, 1907.

2 SHEETS—SHEET 2.

Witnesses:
J. M. Daggett
F. W. Hofmeister

Inventor:
Andrew J. Inglis
By E. W. Burgess
Attorney.

UNITED STATES PATENT OFFICE.

ANDREW J. INGLIS, OF CHICAGO, ILLINOIS.

PNEUMATIC STACKER.

No. 878,530.  Specification of Letters Patent.  Patented Feb. 11, 1908.

Application filed May 13, 1907. Serial No. 373,196.

*To all whom it may concern:*

Be it known that I, ANDREW J. INGLIS, a citizen of the United States, residing at Chicago, in the county of Cook and State of Illinois, have invented certain new and useful Improvements in Pneumatic Stackers, of which the following is a specification.

This invention relates to pneumatic straw elevators and stackers used in connection with threshing and other machines of like character, and it consists in the novel construction and combination of parts hereinafter fully described and claimed.

Figure 1:
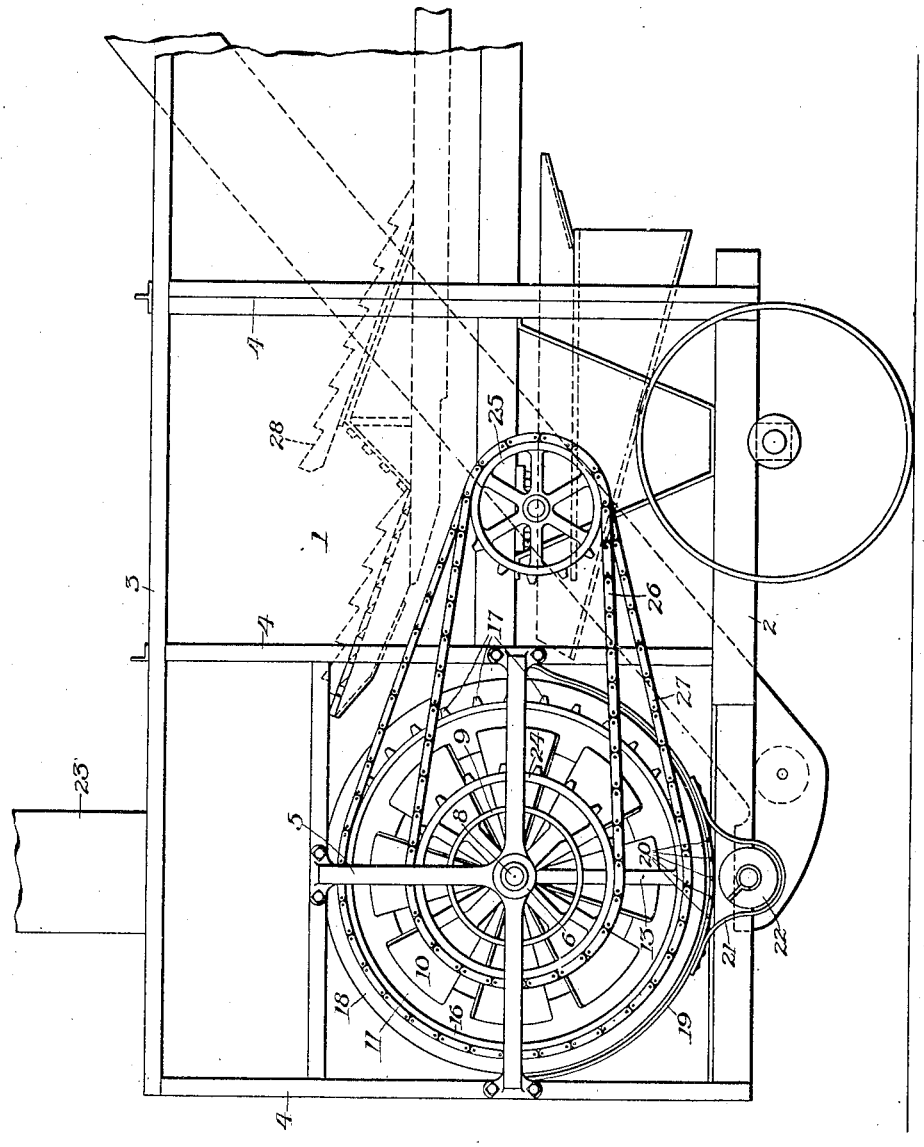
Figure 2:
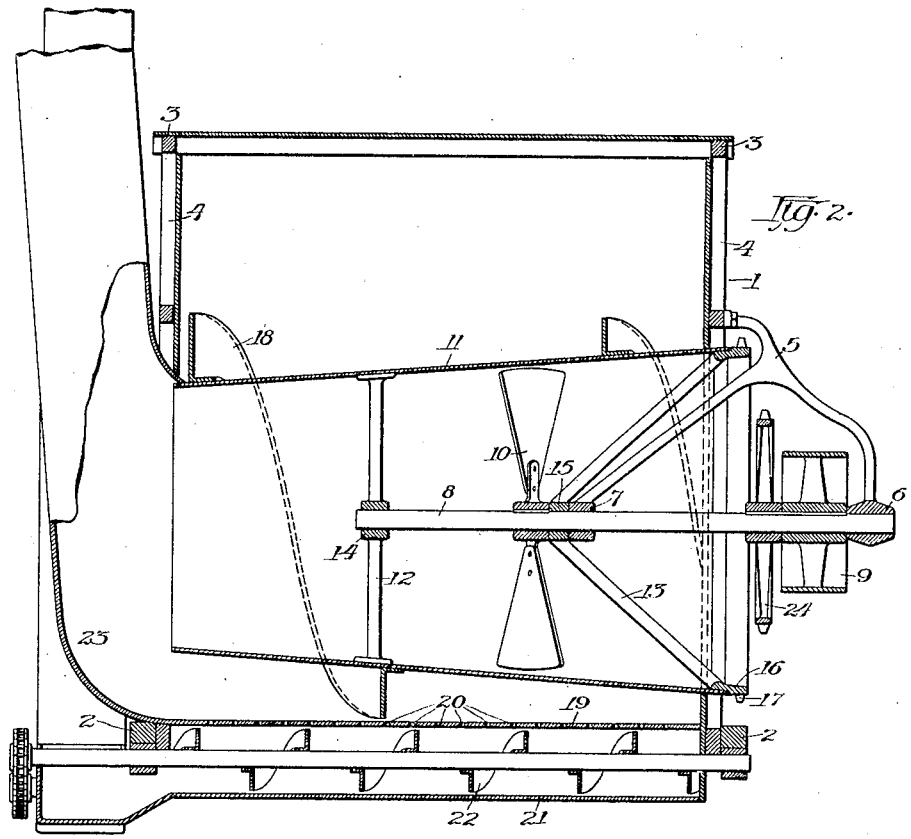
Figure 3:
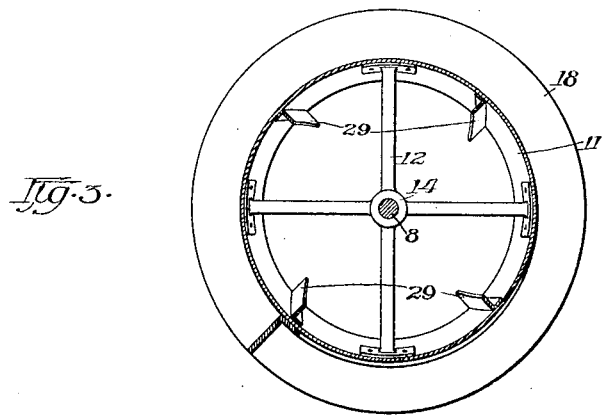

Referring to the drawings—Figure 1 represents a side elevation of the rear portion of a threshing machine having my improvements embodied therein. Fig. 2 is a longitudinal section of the fan and feeding drum; and Fig. 3 is a cross section showing a modified form of drum.

Like reference numerals designate the same parts throughout the several views.

1 represents part of the body frame of a threshing machine, 2 the lower horizontal frame members, and 3 the upper horizontal members, and 4 the vertical frame members at the rear of the machine.

5 is a bracket secured to the frame members of the machine and having an outer journal bearing 6, and an inner bearing 7 forming parts thereof. A shaft 8 is journaled in said bearings and extends transversely partly across the rear end of the machine. A driving pulley 9 is secured to the shaft adjacent to its outer bearing, and a fan 10 is secured thereto beyond its inner bearing. A drum 11 is rotatably mounted upon the shaft by means of spider frames 12 and 13 at its inner and outer ends, respectively, the frames having bearings 14 and 15 to receive the shaft, and the frame 13 having a rim 16 at its outer end that is provided with sprocket teeth 17, by means of which motion is transmitted thereto. The drum has preferably a decreasing diameter toward its delivery end and is provided with spirally arranged flanges 18 upon its periphery.

A casing 19 partially surrounds the drum at its bottom and is provided with perforations 20 communicating with a transverse trough 21 arranged below the casing and in which is mounted a feeding worm 22 having a common form and adapted to deliver grain to any preferred form of elevator and carrier mechanism that may be connected therewith. The casing terminates at its delivery end in a conduit 23, having an opening extending beyond the periphery of the drum and communicating with its interior, which conduit may be arranged in any preferred form to conduct the straw and chaff where desired.

Motion is transmitted to the fan from a source of power by means of the driving pulley 9, and a sprocket wheel 24, secured to the fan shaft, communicates motion to a double sprocket 25 suitably mounted upon the machine by means of a chain 26, and which sprocket in turn transmits motion to the drum by means of a chain 27.

28 represents a common form of shaker and straw advancing mechanism adapted to deliver the straw and chaff rearward toward the stacker mechanism in a common way.

In operation the straw and chaff is delivered to the rear of the machine and falls upon the rotating drum, the direction of rotation of which is preferably in a forward direction, and by means of the spirally arranged ribs thereon is carried laterally toward the mouth of the straw conduit, where it is met by the current of air forced through the interior of the drum by the fan located therein, and is carried through said conduit to the place of deposit by the action of the current of air thereon.

The fan receives its supply of air from without the machine and thus avoids the evil effects of violent air currents within its interior. The fan being located within the revolving drum, the current of air induced thereby is given an initial rotary or cyclonic movement, which effect will become increased as it is pressed onward through the drum and connecting conduit, and for the purpose of a further development of said effect there may be secured to the inner surface of the drum a series of spirally arranged blades 29, as shown in Fig. 3.

As the straw is being operated upon by the surface of the feeding drum, any grain that may have been carried over with it will be finally separated therefrom and, passing through the perforated bottom of the casing, will be received by the grain trough below, and from which it will be transferred by the feed screw to the usual cleaning mechanism.

What I claim as my invention, and desire to secure by Letters Patent, is:

1. A pneumatic stacker having, in combination, a rotatable drum, a fan rotatable coaxially with said drum and inducing an air current therethrough, and a straw and air conduit communicating with the delivery end of said drum.

2. A pneumatic stacker having, in combination, a rotatable drum, a fan rotatably mounted within said drum and adapted to induce a current of air therethrough, and a straw and air conduit communicating with the delivery end of said drum.

3. A pneumatic stacker having, in combination, a rotatable drum, a fan rotatable coaxially therewith being surrounded thereby and inducing an air current therethrough, and a straw and air conduit communicating with the delivery end of said drum.

4. A pneumatic stacker having, in combination, a rotatable drum adapted to receive straw from a threshing machine, ribs arranged spirally on the periphery of said drum and adapted to convey the straw longitudinally thereof, a fan rotatably mounted within said drum and adapted to force a current of air therethrough, spirally arranged ribs on the inner surface of said drum, and an air and straw conduit communicating with the delivery end of the drum.

5. A pneumatic stacker having, in combination, a rotatable drum adapted to receive straw from a threshing machine and convey it longitudinally relative to said drum, a casing partially surrounding said drum at its bottom side, a series of perforations in said casing, and a grain receiver and conveyer below said casing adapted to receive the grain therefrom, a fan adapted to force a current of air through said drum, and a straw and air conduit communicating with the delivery end of said drum.

6. In a pneumatic stacker attachment for threshing machines, the thresher having means for carrying and delivering the straw rearwardly, a rotatable drum arranged transversely across the rear end of the thresher and adapted to receive the straw upon its periphery from the straw carrying mechanism and convey it to one side of the thresher, a blast fan adapted to force a current of air through the interior of said drum, and a conduit at the delivery end of said drum adapted to receive the air and straw therefrom.

ANDREW J. INGLIS.

Witnesses:
   CHAS. W. ALLEN,
   J. I. KELLEY.